United States Patent Office

Re. 28,299
Reissued Jan. 14, 1975

28,299

METHOD AND MECHANISM FOR APPLYING CEMENT IN THE CORNER BETWEEN AN UPPER MARGIN AND AN INSOLE

Jacob S. Kamborian, deceased, late of West Newton, Mass., by Lisbeth N. Godley, Washington, D.C., and Michael M. Becka and Jacob S. Kamborian, Jr., Nashua, N.H., executors, and Costa Caris, East Walpole, Mass.; said Caris assignor to the estate of said Jacob S. Kamborian

Original No. 3,758,904, dated Sept. 18, 1973, Ser. No. 325,701, Jan. 22, 1973. Application for reissue Nov. 8, 1973, Ser. No. 414,045

Int. Cl. A43d *21/00;* B05c *1/06*

U.S. Cl. 12—142 R 26 Claims

Matter enclosed in heavy brackets [ ] appears in the original patent but forms no part of this reissue specification; matter printed in italics indicates the additions made by reissue.

ABSTRACT OF THE DISCLOSURE

A mechanism for applying cement in the corners between the unwiped side portions of an upper margin, that is mounted on a last, and the corresponding side portions of the periphery of an insole that is located in the last bottom. The upper margin side portions are located between the previously wiped toe and heel portions of the upper margin. The mechanism includes a pair of nozzles that travel in unison along the entire lengths of the corners, while the last is supported bottom-up, from the boundaries of the side portions of the upper margin with the wiped toe portion of the upper margin and the boundaries of the side portions of the upper margin with the wiped heel portion of the upper margin. During this travel, the nozzles are yieldably urged downwardly of the insole and outwardly into the corners and the nozzles are mounted to enable them to have relative movement with respect to each other lengthwise of the last so that they can [affect] *effect* this relative movement when arriving at the boundaries.

BACKGROUND OF THE INVENTION

U.S. Pat. 3,675,260 is illustrative of prior art dealing with applying cement into the corners between a portion of an upper margin mounted on a last and the corresponding portion of the periphery of an insole located on the last bottom prior to wiping the upper margin portion against the insole portion. The cement is applied by nozzles that travel along the corners while yieldable heightwise forces are applied by the nozzles against the insole and yieldable outward forces are applied to the nozzles to cause the nozzles to stay in the corners during their travel.

This invention is concerned with an improvement over the cement applying mechanism of the type of U.S. Pat. 3,675,260 that is to be used with a shoe assembly wherein at least one end portion of the upper margin has been wiped against the insole and at least one nozzle travels along an unwiped portion of the upper margin that bounds the previously wiped end portion and applies cement into the corner between the unwiped upper margin portion and the corresponding portion of the insole periphery.

SUMMARY OF THE INVENTION

In a first aspect of the invention, at least one end portion of the upper margin has been wiped against the insole. The shoe assembly is supported bottom-up and a nozzle, located above the shoe assembly, is caused by yieldable downward and outward forces to move into the corner between an unwiped portion of the upper margin and the corresponding portion of the insole periphery in a location that is rearward of the boundary between the unwiped margin portion and the previously wiped end portion of the upper margin. The nozzle is then caused to move towards this boundary, while the downward and outward forces are maintained, until it arrives at the boundary. The nozzle is then caused to move rearwardly away from the boundary, while the downward and outward forces are maintained, and while cement is extruded from the nozzle into the corner until the nozzle arrives at a desired location. The nozzle is then moved inwardly of the corner and raised away from the insole. This arrangement ensures that cement is extruded along the entire length of the unwiped portion of the upper margin between the boundary and the desired location regardless of the length and configuration of the unwiped portion.

In a second aspect of the invention at least one of the end portions of the upper margin has been wiped against the insole and the corners between the unwiped portions of the upper margin that extend rearwardly of the wiped end portion on the opposite sides of the shoe assembly and the corresponding portions of the insole periphery are to have cement extruded therein. This is accomplished by providing a pair of the nozzles, each of which travels along the corners in the unwiped portions of the upper margin towards the boundaries between the unwiped portions and the wiped end portion until the nozzles arrive at the boundaries between these portions after which the nozzles are caused to travel away from these boundaries while cement is extruded from the nozzles. The nozzles are mounted to travel in unison and are also provided with a compensating arrangment that permits relative movement of the nozzles with respect to each other lengthwise of the shoe assembly. The compensating arrangement insures that both nozzles are at the boundaries when the nozzle travel towards the boundaries is completed.

DESCRIPTION OF THE PREFERRED EMBODIMENT

Figure 1:
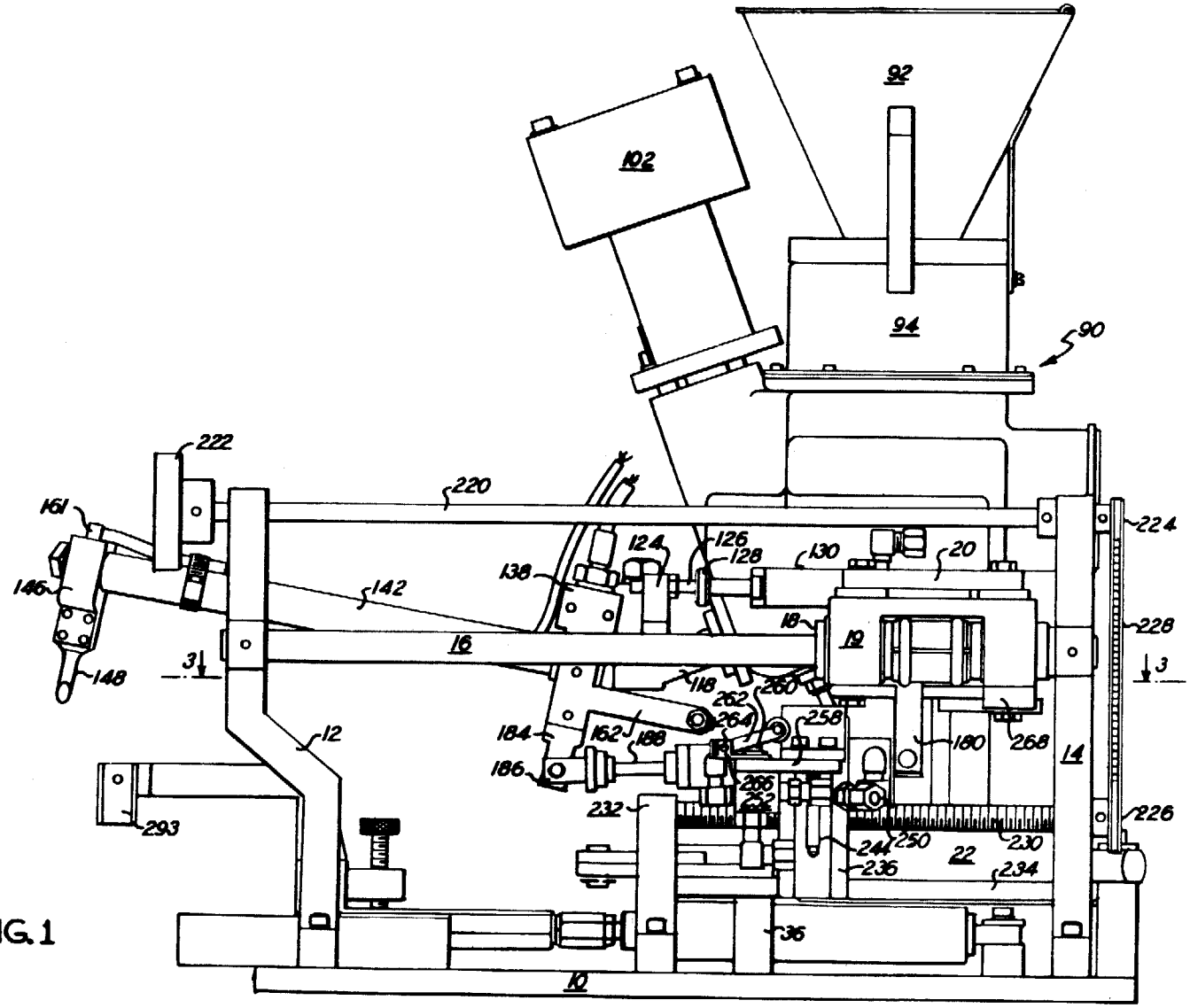
FIG. 1 is a side elevation of the cement applying mechanism.
Figure 2:
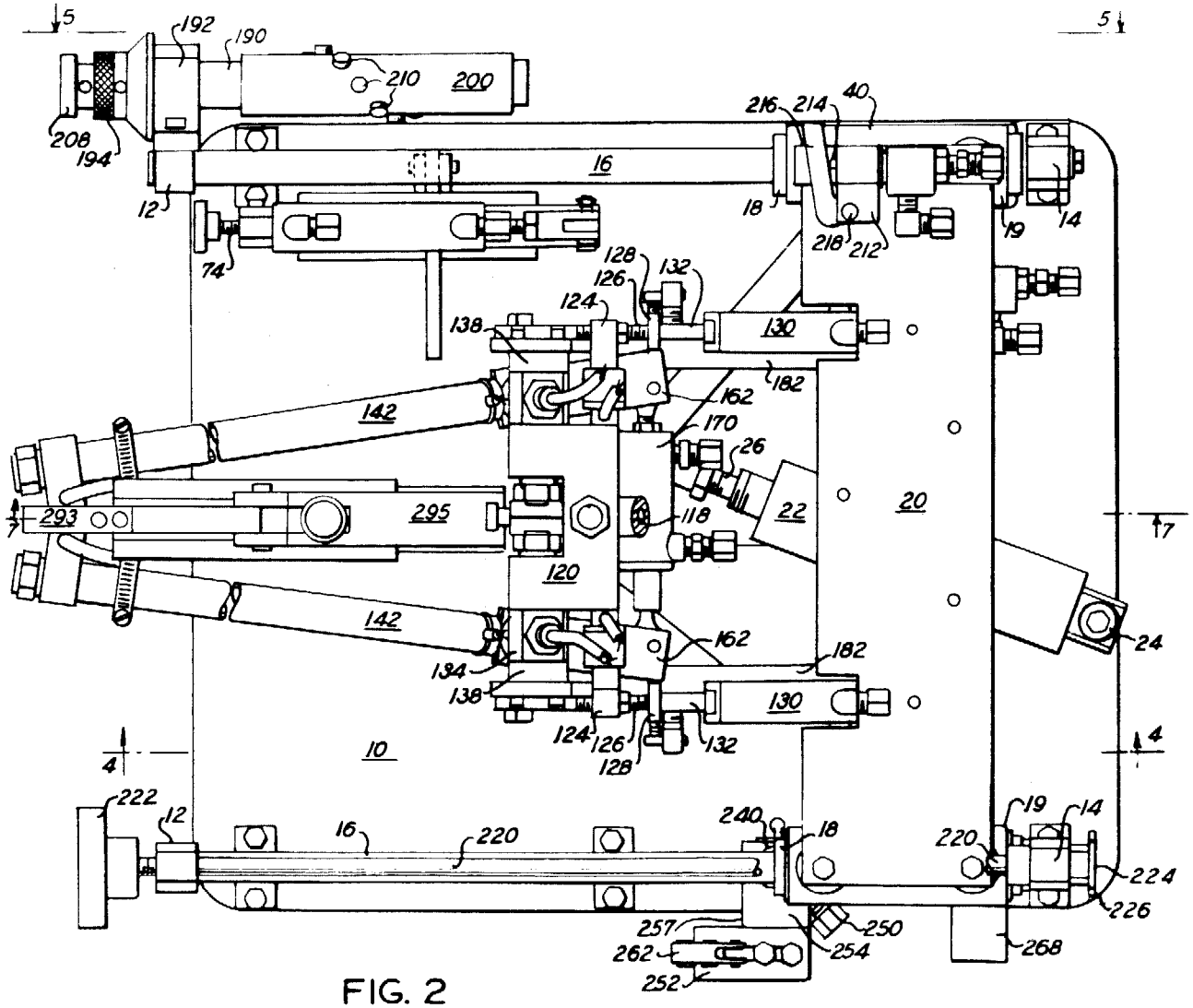
FIG. 2 is a plan of the cement applying mechanism with a cement pot shown in FIG. 1 omitted.

In the description set forth below, the left end of the mechanism as seen in FIGS. 1 and 2 will be considered to be the front of the mechanism and the right end of the mechanism in these figures will be considered to be the back of the mechanism. Directions extending towards the front of the mechanism (right to left in FIGS. 1 and 2) will be considered to be "forward" and directions extending towards the back of the mechanism (left to right in FIGS. 1 and 2) will be considered to be "rearward."

Referring to FIGS. 1 and 2, the cement applying mechanism includes a stationary base 10 having a pair of front posts 12 and a pair of back posts 14 upstanding therefrom. The posts 12 and 14 are located on opposite sides of the base 10 and a pair of slide rods 16 are secured to and extends between each set of posts 12 and 14 so as to be located on opposite sides of the base 10 and so as to extend in forward-rearward directions. A bearing 18 is slidably mounted on each slide rod 16 for forward-rearward movement and a slide plate 20 extends between the bearings 18 and is secured to bearing blocks 19 that are mounted to each of the bearings 18.

An air operated motor 22 is pivoted to a post 24 that extends upwardly of the back of the base 10. The motor 22 extends forwardly of the post 24 and has a forwardly extending piston rod 26 that is pivoted by a pin 28 (FIG. 3) to a link 30 between the ends of this link. One end of the link 30 is pivoted by a pin 32 to the front of a link 34, the back of the link 34 being pivoted to a post 36 that extends upwardly of the base 10 forwardly of the post 24. The link 30 extends rearwardly of the pin 32 and laterally towards a side of the base 10, and the end of the link 30 remote from the pin 32 is pivoted to a post 38 that extends upwardly of the link 30 and is secured to a bearing block 19.

Figure 3:
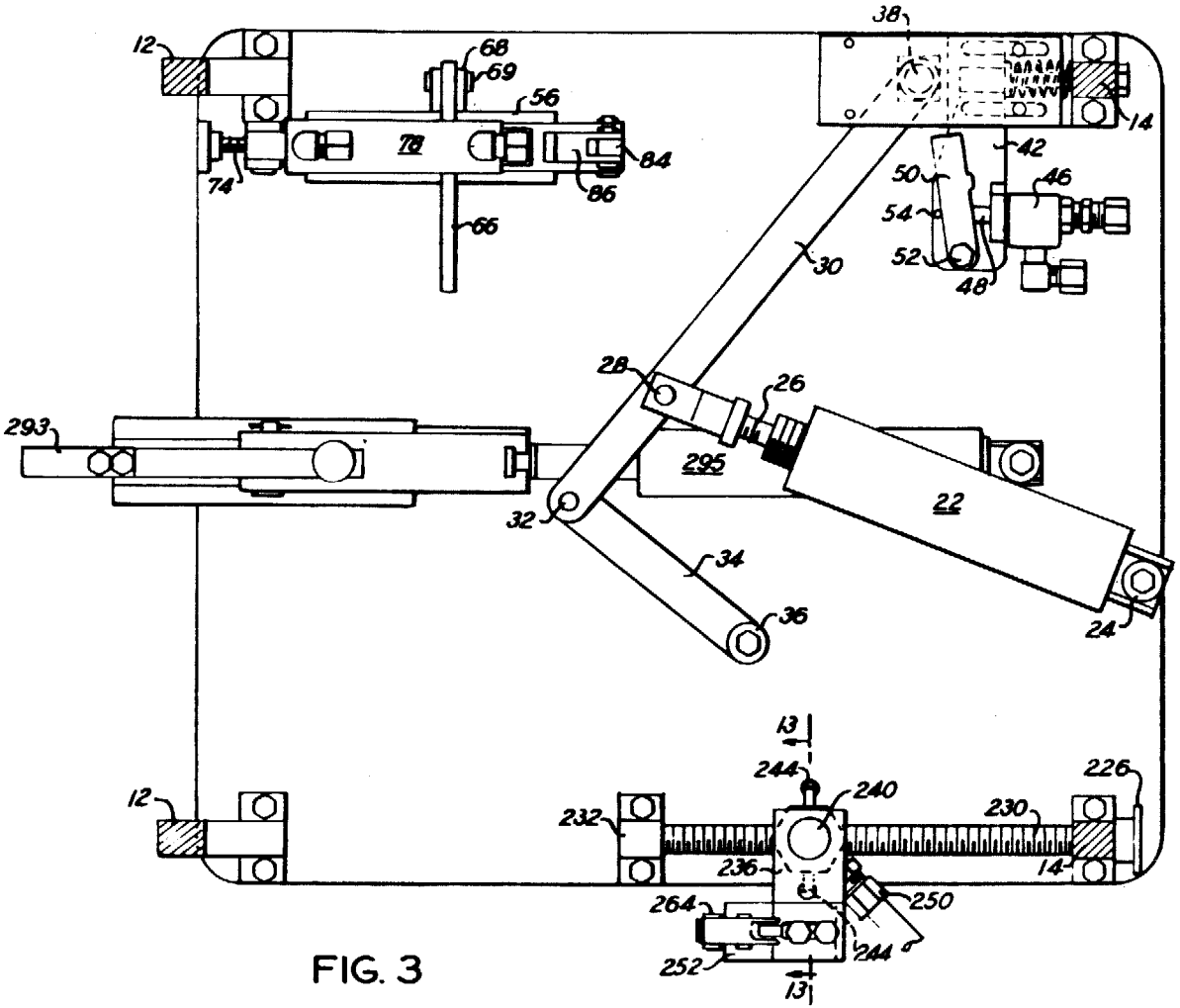
FIG. 3 is a plan view taken along the line 3—3 of FIG. 1.
Figure 5:
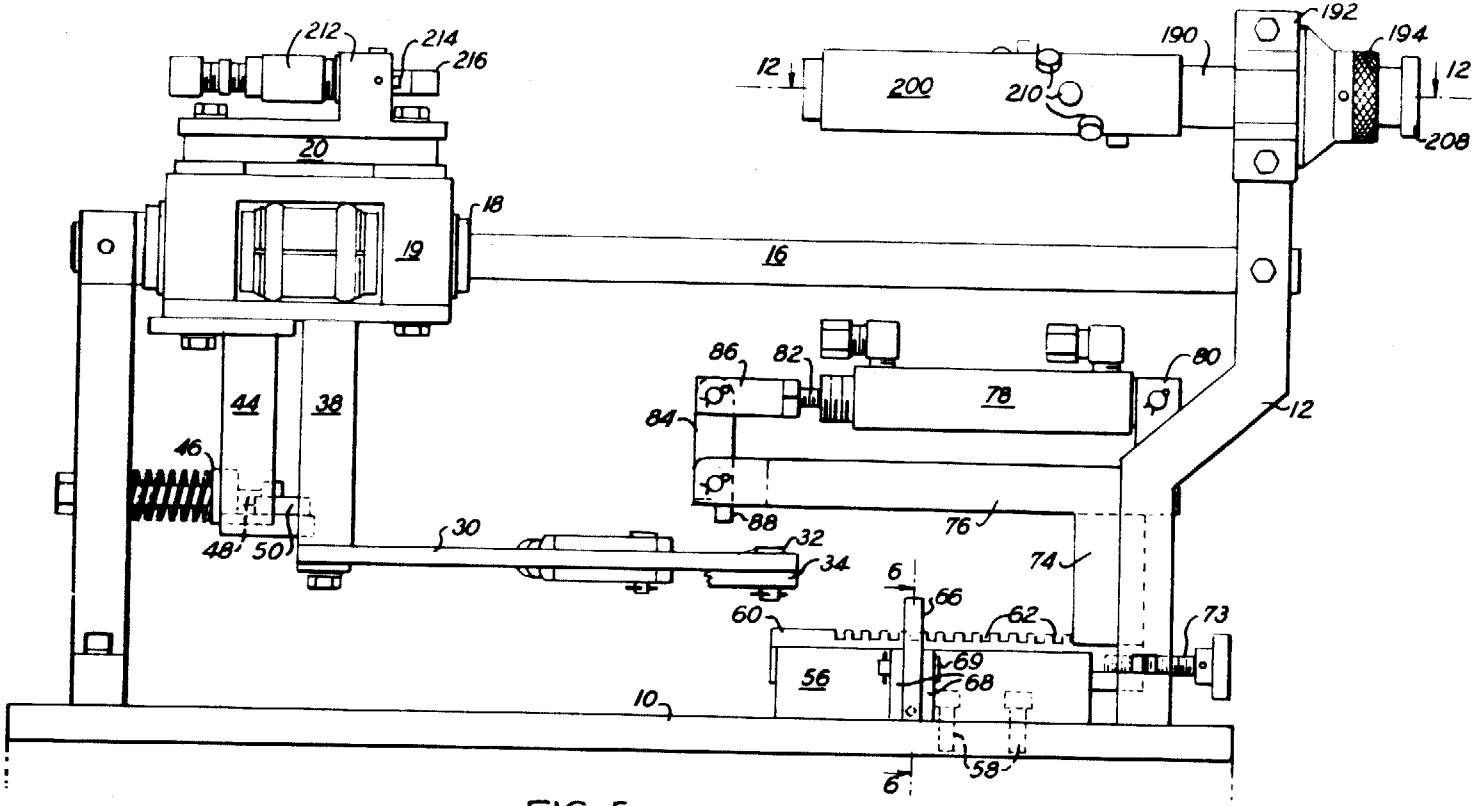
FIG. 5 is a side elevation, showing only part of the mechanism, taken along the lines 5—5 of FIG. 2.

Referring to FIGS. 3 and 5, a projection 42 extends inwardly of the bottom of a post 44 that depends from a bearing block 19. A valve 46, mounted to the projection 42, has a forwardly directed valve stem 48 that is spring urged forwardly by the conventional spring in the valve 46 so as to urge the valve stem 48 against a valve actuating rod 50 that is pivoted to the projection 42 for forward-rearward swinging movement about the axis of a pin 52. The valve stem 48 urges the rod 50 forwardly about the axis of the pin 52 to a position wherein the front of the rod 50 engages a stop pin 54 that is upstanding from the projection 42.

Figure 6:
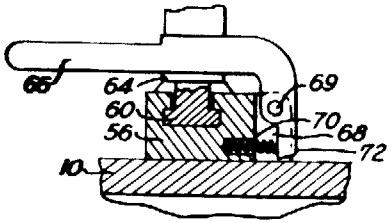
FIG. 6 is a section taken along the line 6—6 of FIG. 5.

Referring to FIGS. 5 and 6, a guide 56, secured to the base 10 by bolts 58, slidably supports a rail 60 for forward-rearward movement. The rail 60 has a plurality of notches 62 in its upper surface that are selectively engagable by a prong 64 that depends from a lever 66. The lever 66 is pivoted to a pair of clevises 68 that are mounted to extend laterally of the guide 56 by a pin 69 and is spring urged into engagement with a selected notch 62 by a compression spring 70 that is interposed between the guide 56 and a downwardly depending leg 72 of the lever 66. A bolt 73 is threaded into the rail 60 so as to effect forward-rearward adjustment of the rail 60 and the parts carried by the rail 60 by pushing and pulling on the bolt 73.

A column 74 extends upwardly of the front of the rail 60 and a support 76 extends rearwardly of this column. An air actuated motor 78 is pivoted to a clevis 80 mounted to the support 76 and the piston rod 82 of the motor 78 extends rearwardly of this motor. The top of a bar 84 is pivoted to a clevis 86 that is secured to the back of the piston rod 82. The bottom of the bar 84 is so pivoted to the back of the support 76 that a stop lug 88 extends below the support 76 in alignment with the outer end of the rod 50 that is remote from the pin 52.

Figure 7:
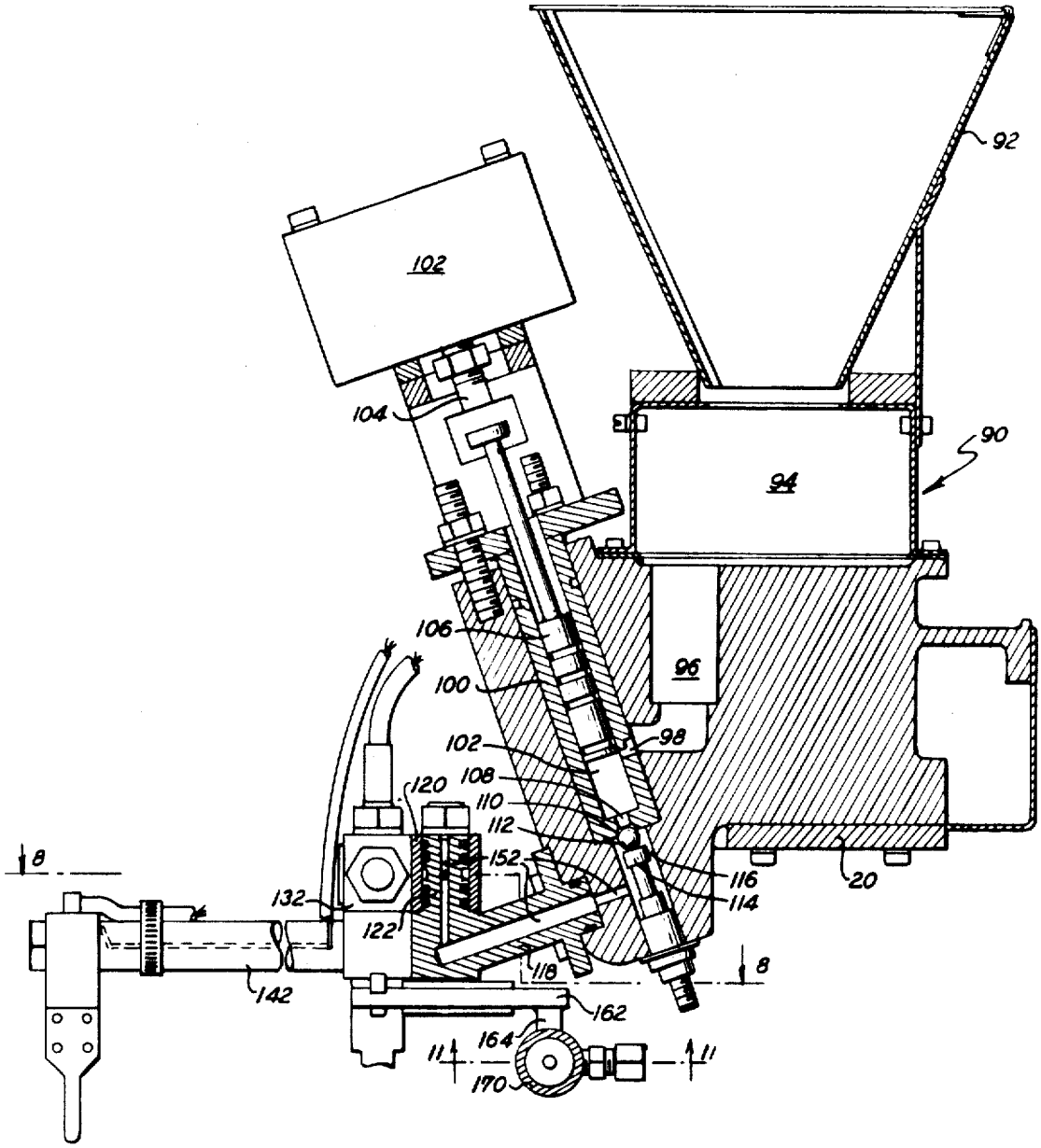
FIG. 7 is a side elevation, partially in section, showing only a part of the mechanism, taken along the line 7—7 of FIG. 2.

Referring to FIGS. 1 and 7, a cement pot 90 is mounted to the slide plate 20 for forward-rearward movement therewith. The cement pot includes a funnel 92 into which solid granules of thermoplastic cement is supplied and a storage chamber 94 into which the solid cement gravitates from the funnel 92 and in which the cement is melted by heating means (not shown). The molten cement gravitates from the chamber 94 through a passage 96 and an orifice 98 in a hollow sleeve 100 into a bore 102 forming the hollow interior of the sleeve 100. The sleeve 100 is mounted to the cement pot 90. An air operated motor 102, also mounted to the cement pot 90, has a downwardly depending piston rod 104 to which is attached a downwardly depending plunger 106 that is slidable in the bore 102. An orifice 108 in the bottom of the sleeve 100 has a valve seat 110 formed thereon that is cooperative with a ball valve 112 to close the orifice 108 in response to upward movement of the plunger 106 in the manner described below. The ball valve normally rests on a support member 114 that is mounted to the cement pot 90 so that communication is provided between the orifice 108 and a passage 116 located below the orifice 108.

Figure 4:
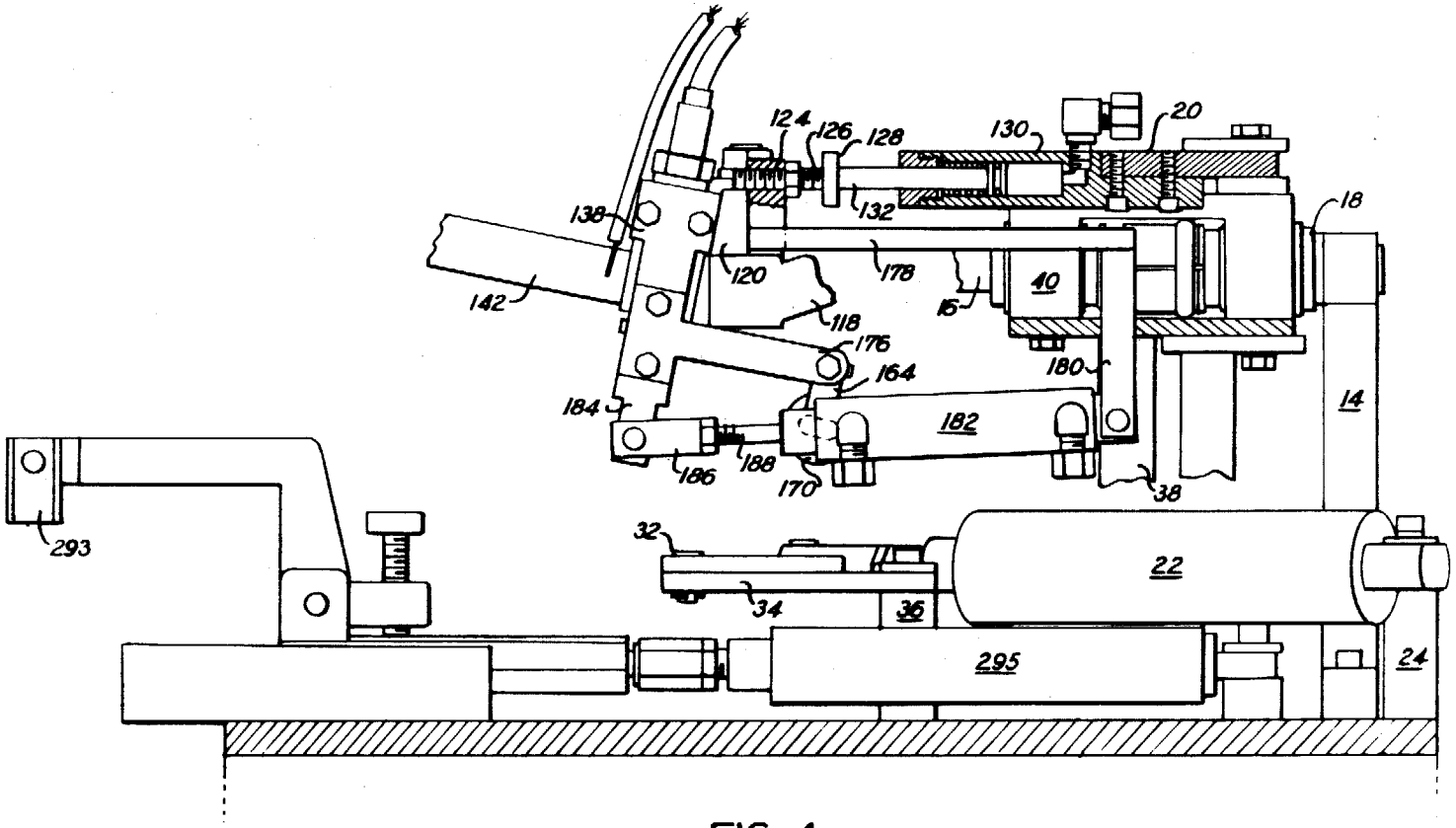
FIG. 4 is a side elevation taken along the line 4—4 of FIG. 2.
Figure 8:
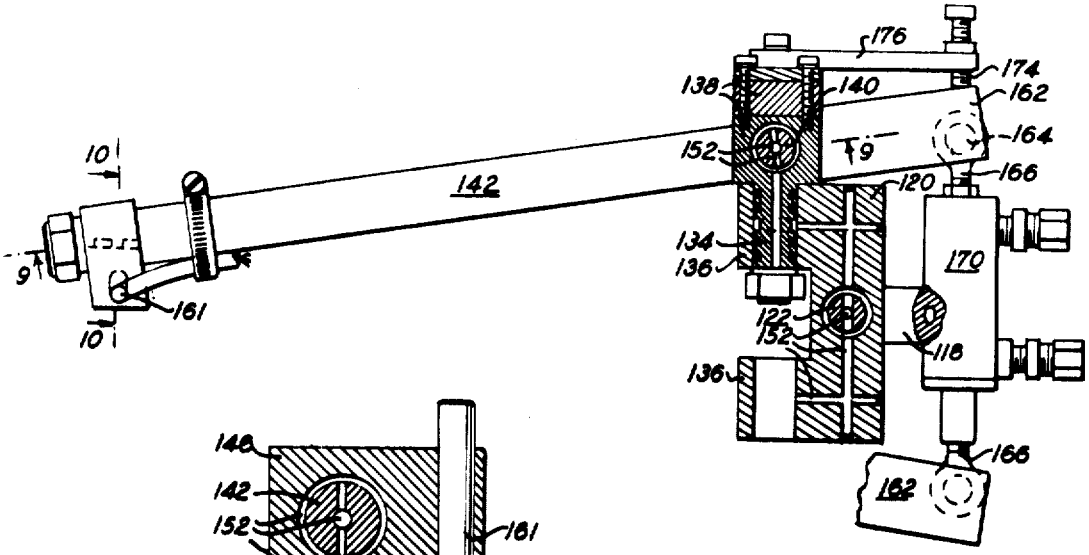
FIG. 8 is a partially sectional view taken along the line 8—8 of FIG. 7.

Referring to FIGS. 7 and 8, a prong 118 is secured to and extends downwardly and forwardly of the cement pot 90. A block 120 is pivoted to a post 122 extending upwardly of the front of the prong 118 for swinging movement about the upright axis of the post 122. A projection 124 (FIG. 2) extends laterally of each side of the block 120 and a stabilizer bolt 126 is secured to each projection 124 with a head 128 of each bolt 126 extending rearwardly of its associated projection 124. As shown particularly in FIGS. 2 and 4, a pair of single acting spring return air operated motors 130 are so mounted to the slide plate 20 that their forwardly directed piston rods 132 are in alignment with the bolt heads 128.

Figure 10:
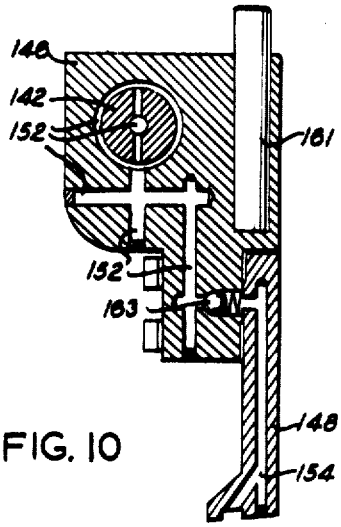
FIG. 10 is a section taken along the line 10—10 of FIG. 8.
Figure 9:
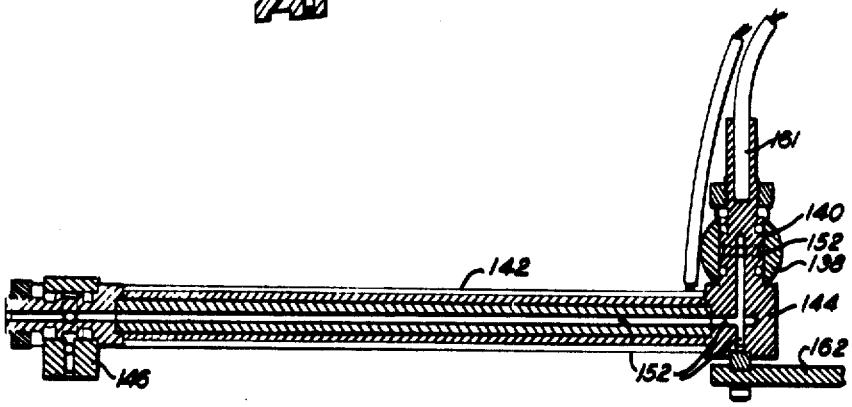
FIG. 9 is a section taken along the line 9—9 of FIG. 8.

A pair of aligned spindles 134 (FIG. 8) are mounted for swinging movement about a horizontal axis in projections 136 of the block 120, the spindles having extensions 138 that extend outwardly of the block 120. A heightwise extending spindle 140 (see FIGS. 8 and 9) is rotatably mounted in each spindle extension 138 and a nozzle carrier 142 is mounted to an extension 144 of the spindle 140 so as to extend forwardly thereof. A nozzle holder 146 is mounted to the front of each nozzle carrier 142 and a nozzle 148 is mounted to and depends downwardly of each nozzle holder 146. Interconnected passage means 152 in the cement pot 90, the prong 118, the block 120, the post 122, the spindles 134, the spindle extensions 138, the spindles 140, the nozzle carriers 142, the nozzle holders 146 and the nozzles 148 provide communication for the molten cement between the passage 116 and passages 154 (FIG. 10) located in each of the nozzles 148. Strategically located eelctric cartridge heaters such as the heaters 161 shown in FIGS. 9 and 10 serve to maintain the cement that is in the passage means 152 and the passages 154 molten. A check valve 163 (FIG. 10) in each nozzle holder 146 yieldably blocks the flow of cement through the passage means 152.

Figure 11:
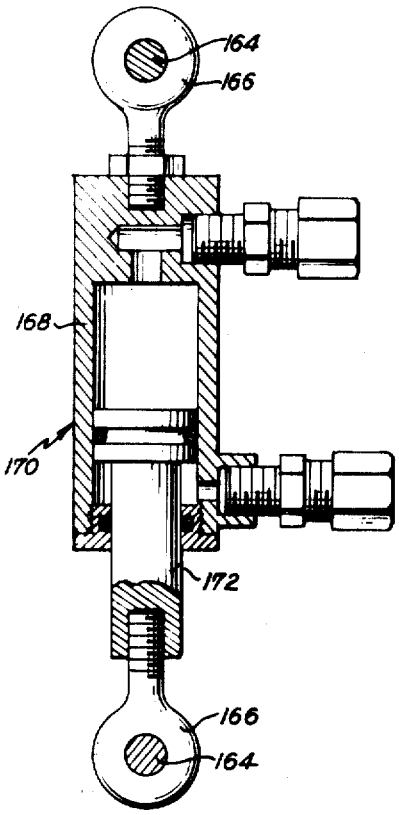
FIG. 11 is a section taken along the line 11—11 of FIG. 7.
Figure 13:
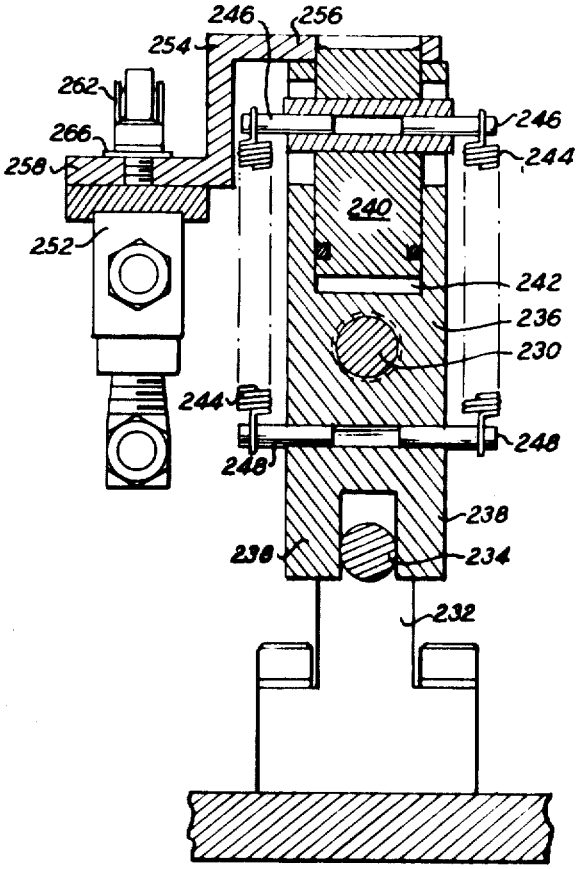
FIG. 13 is a section taken along the line 13—13 of FIG. 3.

Each spindle extension 144 has a bar 162 (FIGS. 7–9) extending rearwardly thereof that has a bar 164 depending from its back end. Each bar 164 is mounted to a yoke 166. One of the yokes 166 is secured to the cylinder 168 (FIG. 11) of an air operated motor 170 and the other yoke 166 is secured to the piston rod 172 of this motor. As described below, the operation of the motor 170 serves to swing the nozzle carriers 142 and the bars 162 about the axes of the spindles 140. The extent of outward movement of the bars 162 and the extent of inward movement of the nozzle carriers 142 is determined by the engagement of the bars 162 with stop bolts 174 that are located outwardly of the bars 162 and are mounted to bars 176 that in turn are secured to their associated block extensions 138.

A rod 178 (FIG. 4) attached to and extending rearwardly of each projection 124 of the block 120 has a post 180 depending from its back, and an air operated motor 182 is pivoted to the bottom of each post 180. A lug 184, depending downwardly of and connected to each spindle extension 138, is pivoted to a clevis 186, that is secured to the piston rod 188 of its associated motor 182, the piston rods 188 projectiong forwardly of the motors 182.

Figure 12:
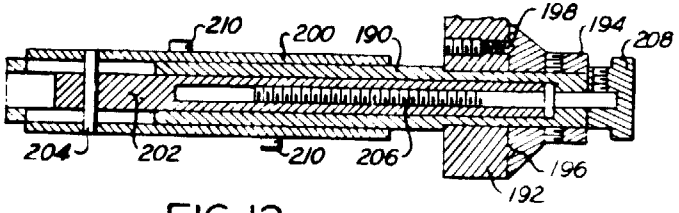
FIG. 12 is a section taken along the line 12—12 of FIG. 5.

Referring to FIGS. 5 and 12, a rod 190 is rotatably mounted in a housing 192 that is secured to the top of one of the front posts 12. A knob 194, secured to the front of the rod 190, has a plurality of recesses 196 therein that are registerable with a spring pressed detent 198 in the housing 192 so that the rod 190 may be rotated by the knob 194 and held in a desired position by the pressing of the detent 198 in a desired recess 196. A sleeve 200 and a core 202 are connected to each other by a pin 204 and are slidably mounted on the rod 190 for forward-rearward movement. A bolt 206 is threaded into the core 202 and is rotatable by a handle 208 so as to adjust the forward-rearward position of the sleeve 200. A plurality of stop knobs 210 are mounted to the sleeve 200 so as to project radially therefrom in a spiral pattern.

Referring to FIGS. 2 and 5, a valve 212 is mounted to the slide plate 20 and has a forwardly projecting valve stem 214 that is resiliently urged forwardly by the conventional spring in the valve 212 so as to urge the valve stem 214 against a valve actuating bar 216 that is pivoted to the valve 212 on a pin 218. The outer end of the bar 216 is in alignment with a selected one of the knobs 210.

Referring to FIGS. 1, 2, 3 and 13, a rod 220 extends between and is rotatably mounted in a front post 12 and a back post 14. A knob 222 is mounted to the rod 220 forwardly of its associated front post 12 rearwardly of its associated back post 14, the rod 220 is connected by sprockets 224 and 226 and a chain 228 to a threaded shaft 230 that is rotatably mounted in the back post 14 associated with the rod 220 below the rod 220 and extends forwardly of this post 14. The front of the shaft 230 is rotatably mounted in a pillar 232 that is secured to and extends upwardly of the base 10. A rod 234 extends between and is secured to the pillar 232 and the back post 14 associated with the shaft 230 and is located below the shaft 230. A block 236 is threaded onto shaft 230 and has a pair of depending lugs 238 that straddle the rod 234 whereby the forward-rearward position of the block 236 may be adjusted by rotating the knob 222 to rotate the threaded shaft 230. An air operated cylinder 240 is mounted for heightwise movement in a cavity 242 in the block 236 and is resiliently urged downwardly of the block by tension springs 244 that extend between pins 246 anchored to the cylinder 240 and pins 248 anchored to the block 236. The bottom of the cavity 242 is in communication with a coupling 250 that is connected, via lines described below, to a source of pressurized air. A valve 252 is mounted to a flange 254 that is secured to the top of the cylinder 240, the valve 252 being offset outwardly of the cylinder 240. The flange 254 includes a forwardly facing upper portion 256 having a forwardly facing stop surface 257 (FIG. 2) that is approximately at the level of the top of the cylinder 240 and a lower surface portion 258 to which the valve 252 is mounted and through which the upwardly projecting valve stem 260 of the valve 252 extends, the valve stem 260 being urged upwardly by the conventional spring in the valve 252 so as to bear against a valve actuating rod 262 that is pivoted for heightwise movement by means of a pin 264 that is mounted to a bracket 266 that in turn is secured to the flange portion 258. A cam 268 is mounted to the btaring block 19 associated with the back post 14 in which the shaft 230 and the rod 234 are mounted. The cam 268, as described below, is in alignment with the shop surface 257 and the valve actuating rod 262 when the cylinder 240 has been raised to an upper position.

In the idle condition of the machine; the piston rod 26 is retracted into the motor 22 to thereby locate the slide plate 20 and the parts carried thereby, including the cement nozzle 148, in a rearward position with the cam 268 located rearwardly of the valve 252 and the flange 254; the piston rod 82 is retracted into the motor 78 so that the stop lug 88 is in alignment with the rod 50; the piston rod 104 is retracted into the motor 102 so that the bottom of the plunger 106 is above the orifice 98; the piston rods 132 are projecting out of the motors 130 and bear against the bolt heads 128 so that the block 120 is locked against movement about the upright axis of the post 122; the cylinder 168 and the piston rod 172 of the motor 170 are extended away from each other so that the nozzles 148 are swung about the axes of the spindles 140 to positions that are relatively close to each other in positions determined by the engagement of the bars 162 with the stop bolts 174; the piston rods 188 are projected out of the motors 182 to thereby swing the nozzles 148 about the axis of the spindles 134 to raised positions; and the cylinder 240 is retained in a lowered position in the block 236 by the springs 244 to thereby lower the stop surface 257 and the valve actuating rod 262 out of intersecting relation with respect to the cam 268.

Thermoplastic cement is placed in the funnel 92 of the cement pot 90, gravitates into the chamber 94 wherein it is melted, and the molten cement flows from the chamber 94 through the passage 96, the orifice 98, the passage 116, and the passage means 152 up to the valves 163 in the nozzle holders 146.

Figure 2A:
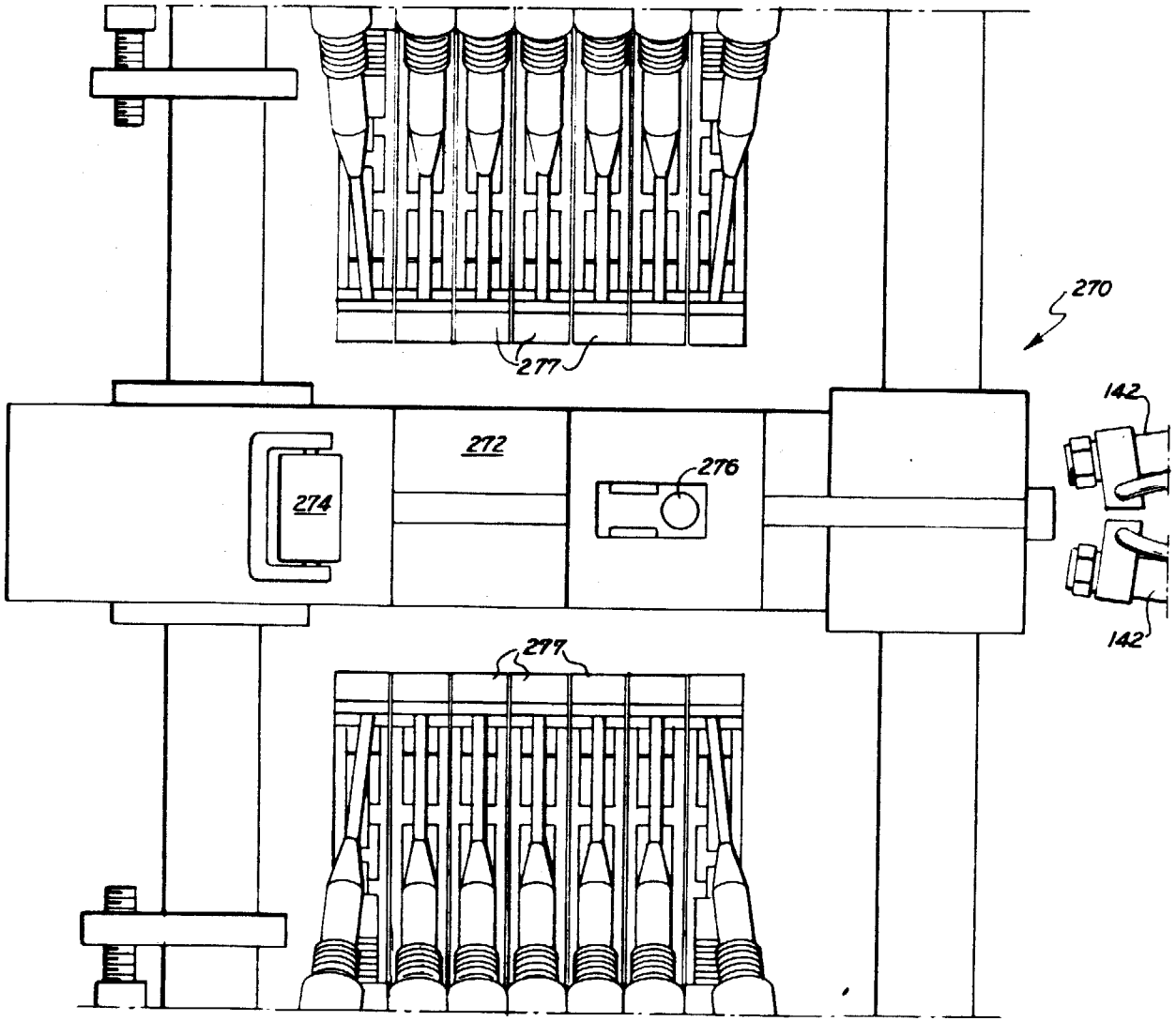
FIG. 2A is a plan view of a lasting machine used with the cement applying mechanism.

The cement applying mechanism of this invention is intended to be used with a shoe lasting machine 270 (FIG. 2A) of the type disclosed in pending application Ser. No. 227,376 filed Feb. 18, 1972. The lasting machine 270, which is located forwardly of the cement applying mechanism, includes a shoe support 272 that incorporates a toe rest 274 and a last pin 276. A plurality of lasting instrumentalities 277 are located on each side of the shoe support 272.

Figure 15A:
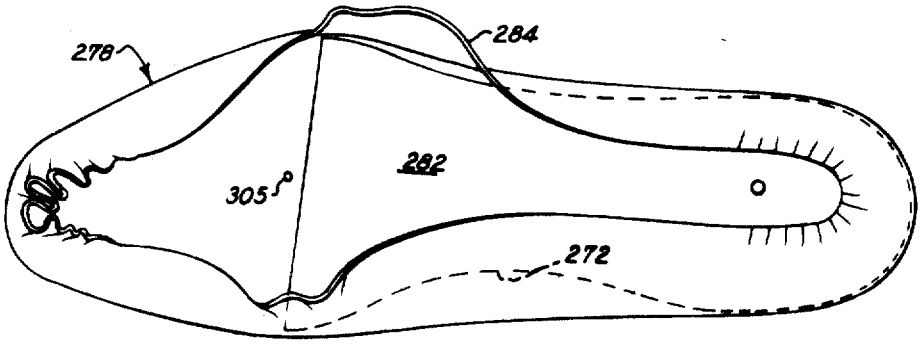
FIG. 15A is a view taken along the line 15A—15A of FIG. 15.
Figure 15:
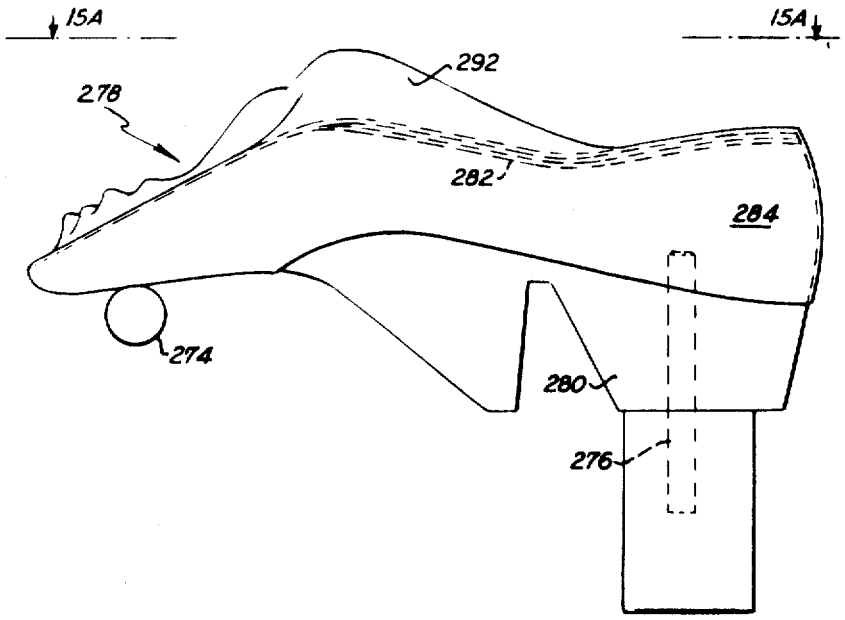
FIG. 15 is a representation of the shoe assembly as it is supported prior to the operation of the cement applying mechanism.

A shoe assembly 278 (FIGS. 15 and 15A), comprising a last 280 having an insole 282 located on its bottom and an upper 284 mounted thereon, is placed bottom-down on the shoe support 272 with the vamp of the shoe assembly resting on the toe rest 274 and with the last pin 276 inserted into the thimble in the back portion of the last so that the toe of the shoe assembly [fares] *faces* forwardly. Prior to placement in the lasting machine, the shoe assembly 278 had been toe lasted and heel seat lasted.

Figure 16:
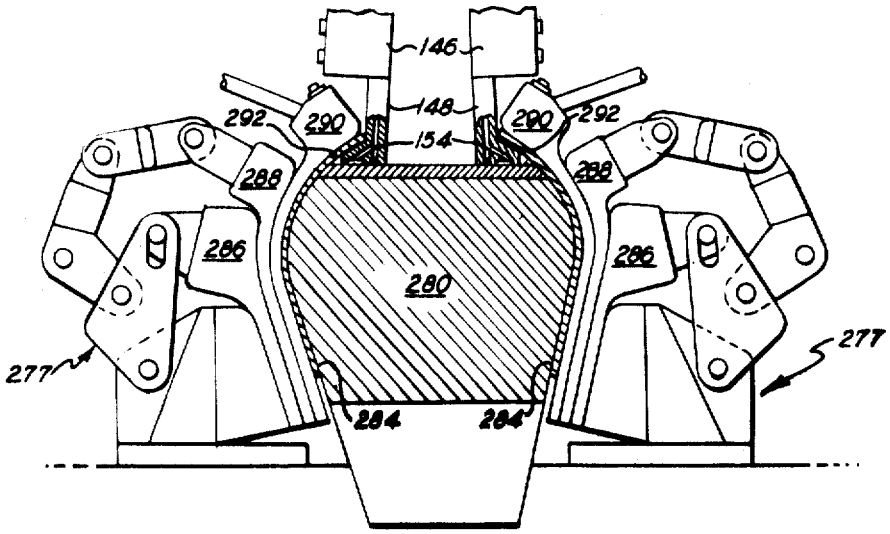
FIG. 16 is a view showing the nozzles as they appear when applying cement into the corners between the side portions of the upper margin and the corresponding portions of the insole periphery.

Referring to FIG. 16, each lasting instrumentality 277 is formed of three plies, the outer ply being an outer presser strap 286, the middle ply being an inner presser strap 288, and the inner ply being a lasting strap 290. In the manner described in the aforementioned application Serial No. 227,376, the lasting instrumentalities are brought to the FIG. 16 position wherein they engage the side portions of the shoe assembly between the previously lasted toe and heel portions. In this position, the margins 292 of the unlasted side portions of the upper margin extend upwardly of the insole 282, the lasting instrumentality plies 286, 288 and 290 are pressing the side portions of the upper 284 against the last 280 and the top segments of the lasting straps 290, which extend upwardly of the insole 282, are forced inwardly to provide inwardly directed back-up forces that fold the top segments of the lasting straps downwardly and inwardly of the insole periphery to cause the upper margin 292 to be folded downwardly about the periphery of the insole, part way towards the insole, to form an acute angle with the nsole. In this position, a hold-down 293 (FIG. 4) operated by an air operated motor 295 may bear against he insole 282 to hold the shoe assembly in position.

Figure 14:
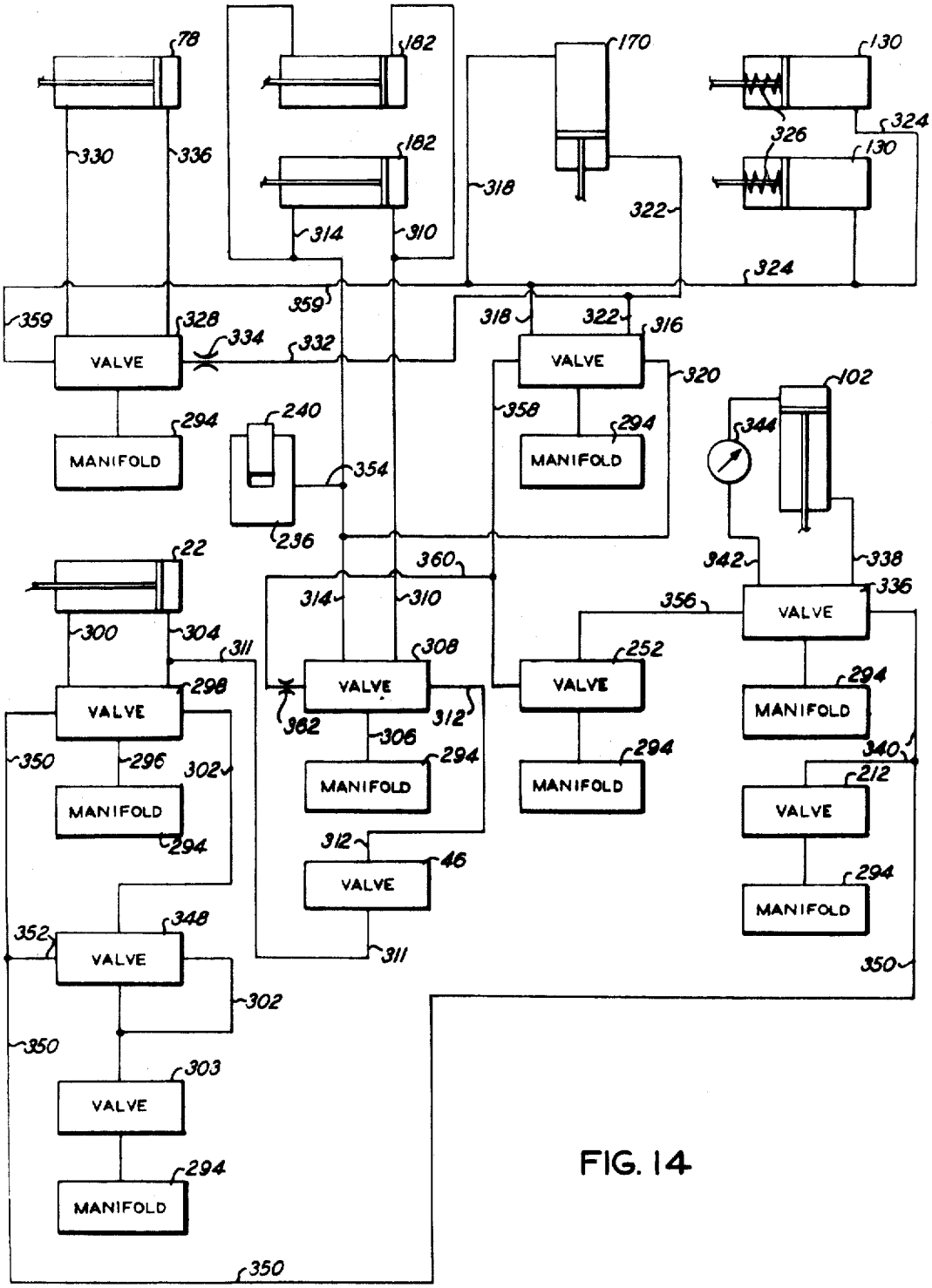
FIG. 14 is a schematic representation of the control circuit of the mechanism.

Referring to the schematic representation of a portion of the machine control circuit shown in FIG. 14, the motor 22 is retained in its idle position by pressurized air passing from a manifold 294 through a line 296, a valve 298 and a line 300 to the rod end of this motor. At the beginning of the cycle of the cement applying mechanism, a manually actuable valve 303 is momentarily shifted to permit pressurized air to pass from the manifold 294 through the valve 303 and a pilot line 302 to a valve 348 to shift the valve 348. The shifting of the valve 348 enables pressurized air to pass from the valve 303 through the valve 348 and a pilot line 302 to the valve 298 to shift the valve 298. The shifting of the valve [292] *298* causes pressurized air to pass from the valve 298 to the blind end of the motor 22 through a line 304 while the air in the line 300 is vented to atmosphere through the valve 298. This causes the slide plate 20 and the parts carried thereby, including the nozzles 148, to move forwardly until the valve actuating rod 50 engages the stop lug 88 at a position determined by the notch 62 that is engaged by the prong 64 so as to place the nozzles 148 over the widest part of the shoe assembly, indicated by numeral 305 in FIG. 15A.

The engagement of the rod 50 by the lug 88 causes the valve 46 to open. The motors 182 are retained in their idle positions by pressurized air passing from the manifold 294 through a line 306, a valve 308 and a line 310 to the blind ends of these motors. The opening of the valve 46 causes pressurized air to pass from the line 304 through a line 311, the valve 46 and a pilot line 312 to the valve 308 to shift the valve 308 so as to cause pressurized air to pass from the valve 308 through a line 314 to the rod ends of the motors 182 while the air in the line 310 is vented through the valve 308. This operation of the motors [183] *182* causes the nozzles 148 to be lowered under the yieldable force of the pressurized air in the motors 182 until they engage the insole 282 in the general region indicated by number 305 in FIG. 15A wherein the nozzles are spaced from the upper margin 292 and the insole periphery laterally of the portions of the side portions of the upper margin and the corresponding portions of the insole periphery that are between the previously wiped toe end and heel end portions of the upper margin.

The motor 170 is maintained in its idle position by pressurized air passing from the manifold 294 through a valve 316 and a line 318 to the motor 170. The shifting of the valve 308 causes pressurized air to pass from the line 314 and a pilot line 320 to the valve 316 to shift the valve 316 so as to cut off the flow of pressurized air through the line 318 and cause pressurized air to pass from the valve 316 and a line 322 to the motor 170 to thereby so actuate the motor 170 as to move the yokes 166 towards each other under the yieldable force of the pressurized air and thus move the nozzles 148 outwardly along the insole 282 into the angle between the insole and the upper margin 292 until the nozzles engage the upper margin as shown in FIG. 16.

The motors 130 are maintained in their idle positions by pressurized air passing from the line 318 through a line 324 to the blind ends of these motors. The shifting of the valve 316 shuts off the flow of pressurized air to the motors 130 through the line 324 so that the return springs 326 can move the piston rods 132 of these motors rearwardly out of engagement with the bolt heads 128 to thus enable the block 120, together with the nozzles 148, to be capable of swinging movement about the upright axis of the post 122 for reasons that are given below. Up to this time in the operating cycle, it is desirable to constrain the block 120, and thus the nozzles 148, against swinging movement about the axis of the post 122 to ensure that the nozzles are centered above the shoe assembly inwardly of the upper margins 292 when they are caused by the motor 182 to descend against the insole 282 so that, when the nozzles are moved outwardly by the motor 170, the nozzles will enter the angle between the upper margin 292 and the insole 282.

The motor 78 is maintained in its idle condition by pressurized air passing from the manifold 294 through a valve 328 and a line 330 to the rod end of the motor 78. The shifting of the valve 316 enables pressurized air to pass from the line 322 through a pilot line 332 and a flow control valve 334 to the valve 328 to shift the valve 328 after a time delay. The shifting of the valve 328 cuts off the flow of pressurized air through the line 330 and enables pressurized air to flow from the valve 328 and a line 336 to the blind end of the motor 78 to thus cause the motor 78 to raise the stop lug 88 and disengage it from the valve actuating rod 50, thus causing the valve 46 to close and enabling the motor 22 to again move the plate 20 and the nozzles 148 forwardly. The closing of the valve 46 shuts off the flow of pressurized air to the valves that had been shifted pursuant to the opening of the valve 46, but the valves that had been so shifted remain in shifted position due to inertia. The forward motion of the plate 20 and nozzles 148 continues until the valve actuating bar 216 engages the stop knob 210 that is in alignment with it. During this resumption of the forward motion of the nozzles 148, they are resiliently urged downwardly against the insole 282 by the motors 182 and are resiliently urged outwardly against the upper margin 292 by the motor 170 so that they are bearing against the insole and the upper margin when they terminate their forward motion. The stop knob 210 in alignment with the bar 216 had been selected in accordance with the length of the shoe assembly and the toe lasted area of the shoe assembly so that at the conclusion of the forward motion of the nozzles 148, the nozzles are located at the boundary between the wiped toe portion of the upper margin and the unwiped side portions of the upper margin. Since the block 120, together with the nozzles 148, are free to swing about the axis of the post 122, the block, together with the nozzles, may swing about this axis in one direction or the other should this boundary be located more toward on one side of the shoe assembly than the other or should one nozzle arrive at this boundary before the other due to the variation in distances of the insole periphery on the opposite sides of the shoe assembly from the longitudinal center line of the shoe assembly.

The motor 102 is retained in its idle condition by pressurized air passing from the manifold 294 through a valve 336 and a line 338 to the rod end of the motor. The engagement of the actuating bar 216 with the stop knob 210 opens the valve 212 so that pressurized air may flow from the manifold 294 through the valve 212 and a pilot line 340 to the valve 336 to shift the valve 336. The shifting of the valve 336 cuts off the flow of pressurized air in the line 338 and enables pressurized air to flow from the valve 336 through a line 342 and a pressure regulator 344 to the blind end of the motor 102 to operate this motor at a speed determined by the setting of the pressure regulator 344 to thereby move the plunger 106 downwardly past the orifice 98 and force cement through the passage means 152, the check valves 163 and the passages 154 in the nozzles 148 into the angle between the upper margin and the insole 282.

The opening of the valve 212 enables pressurized air to pass from line 340 through a pilot line 350 to the left side of the valve 298 to thereby restore the valve 298 to its idle condition so that the pressurized air again flows into the rod end of the motor 22 to cause the motor 22 to move the slide 20 and the nozzles 148 rearwardly. At the same time pressurized air passes from the pilot line 350 through a pilot line 352 to the left side of the valve 348 to return the valve 348 to its idle condition. As [s] *a* result of the rearward movement of the slide 20, the valve 212 closes due to the movement of the valve actuating the bar 216 from the knob 210 that it had engaged, but the valves that had been shifted pursuant to the opening of the valve 212 remain shifted due to inertia.

The aforementioned shifting of the valve 308, pursuant to the opening of the valve 46 by the engagement of the lug 88 with the valve actuating rod 50, had caused pressurized air to flow from the line 314 through a line 354 through the block 236 into the bottom of the cavity 242 by way of the coupling 250 to thereby raise the cylinder 240 to bring the stop surface 257 and the valve actuating rod 262 into the intersecting relationship with the cam 268. At this time, the cam is forward of the stop surface 257 and the rod 262 so that it does not intersect them during the forward movement of the plate 20. The slide 20, together with the nozzles 148, continues its rearward movement until the cam 268 engages the stop surface 257 and engages the valve actuating rod 262 to thereby open the valve 252. The stop surface 257 had been so located by the knob 222, in accordance with the dimensions of the shoe assembly and the area of the heel portion of the upper margin that had previously been wiped against the insole, that when the nozzles 148 stop their rearward movement, due to the engagement of the cam 268 with the the stop surface 257, the nozzles 148 are approximately at the boundary between the unwiped side portions of the upper margin 292 and the previously wiped heel portion of the upper margin.

During the rearward movement of the nozzles from the boundary of the unwiped side portion of the upper margin 292 with the previously wiped toe portion of the upper margin to the boundary of the unwiped side portions of the upper margin with the previously wiped heel portion of the upper margin, the cement is continuously being extruded from the nozzles passages 154 into the angle between the upper margin and the insole 282, the nozzles 148 are continuously being yieldably urged downwardly against the insole 282 by the motors 182, and the nozzles 148 are continuously being urged yieldably outwardly against the upper margin 292 by the motor 170. Therefore, during the rearward cement extruding movement of the nozzles 148 they are able to remain in the angle between the insole 282 and the upper margin 292 in desirable positions for the extrusion of the cement regardless of the contour of the bottom of the insole and regardless of the contour of the insole periphery. During the rearward cement extruding movement of the nozzles 148, the block 120 and the nozzles 148 are still free to swing about the axis of the post 122 one way or the other to compensate for one nozzle arriving at the boundary between an unwiped side portion of the upper margin and the wiped heel portion of the upper margin *before the other nozzle* and thus provide the advantages discussed above in connection with the forward movement of the nozzles towards the boundary between the unwiped side portions of the upper margin and the wiped toe portion of the upper margin.

The opening of the valve 252 enables pressurized air to flow from the manifold 294 through the valve 252 and a pilot line 356 to the valve 336 to shift this valve back to its idle condition and thereby cause the motor 102 to terminate the downward movement of the plunger 106 and raise this plunger to its idle position to terminate the extrusion of the cement through the nozzles 148.

The opening of the valve 252 also enables pressurized air to flow from the valve 252 through a pilot line 358 to the left side of the valve 316 to shift the valve 316 back to its idle condition to thereby cause the motor 170 to return to its idle condition and swing the nozzles 148 inwardly from the upper margin 292 to their idle positions. The shifting of the valve 316 also causes the motors 130 to project their piston rods 132 forwardly against the bolt heads 128 to thereby lock the block 120 and the nozzles 148 against movement about the axis of the post 122. The shifting of the valve 316 also causes pressurized air to flow from the line 318 through a pilot line 359 to the left side of the valve 328 to shift the valve 328 back to its idle position and thus cause the motor 78 to lower the stop lug 88 to its idle position.

The opening of the valve 252 also enables pressurized air to flow from the line 358 through a pilot line 360 and a flow control valve 362 to the left side of the valve 308 to shift the valve 308 back to its idle position after a time delay caused by the flow control valve 362 to thereby cause the motors 182 to raise the nozzles 148 to their idle position. The shifting of the valve 308 also cuts off the flow of pressurized air to the cylinder 240 through the line 354 to thereby enable line 354 to thereby enable the springs 244 to lower the cylinder 240 to its idle position. The lowering of the cylinder 240 to its idle position lowers the flange 254 and its stop surface 257 out of intersecting relationship with the cam 268 and lowers the valve 252 and the valve actuating rod 262 so that the valve actuating rod 262 no longer bears against the cam 268 and the valve 252 is closed. The closing of the valve 252 cuts off the flow of pressurized air from this valve to the valves that were shifted in response to the opening of the valve 252, but the valves that were shifted in response to the opening of the valve 252 remain in shifted position due to inertia. The lowering of the stop surface 257 out of intersecting relationship with the *cam 252* [stop surface 257] enables the motor 22 to resume the rearward movement of the plate 20 and the nozzles 148 until they reach their idle positions with the nozzles in a position to the rear of the shoe assembly so as to not interfere with the subsequent removal of the shoe assembly from the shoe support 272 and so that any cement that may drip from the nozzles will not fall on the shoe assembly.

Now the top segments of the lasting straps 290 are forced downwardly and inwardly from their FIG. 16 position, in the manner disclosed in application Ser. No. 227,376, to wipe the side portions of the upper margin 292 against the insole 282 and bond it thereto by means of the cement that was extruded into the angle between the upper margin and the insole. The lasting instrumentalities 277 are then moved outwardly away from the shoe assembly, the hold-down 293 is disengaged from the shoe assembly by the motor 295 and the lasted shoe is removed from the support 272.

We claim:

1. A cement applying mechanism comprising: support means for supporting bottom-up a shoe assembly that includes a last having an insole located on its bottom and an upper mounted thereon, at least one end portion of the margin of the upper having been wiped against the insole and an unwiped portion of the upper margin extending rearwardly of said wiped end portion and extendingly upwardly of the corresponding portion of the insole periphery; a nozzle, located above the shoe assembly, mounted for forward-rearward movement; means for applying a yieldable downward force *and a yieldable outward force* to the nozzle *such as* to cause the nozzle to bear against the insole *in the corner between said unwiped upper margin portion and said corresponding portion of the insole periphery* rearwardly of *the boundary between said wiped and unwiped portions;* [said wiped end portion and spacedly from said unwiped portion of the upper margin and said corresponding portion of the insole periphery; means for thereafter applying a yieldable outward force to the nozzle, while the downward force is maintained, to cause the nozzle to move into the corner between said unwiped upper margin portion and said corresponding portion of the insole periphery rearwardly of the boundary between said wiped and unwiped portions;] means for thereafter moving the nozzle forwardly, while said downward and outward forces are maintained, until the nozzle arrives at said boundary; means for thereafter moving the nozzle rearwardly, while said downward and outward forces are maintained, and for concomitantly extruding cement through the nozzle, until the nozzle arrives at a desired location along said unwiped portion of the upper margin to thereby cause the cement to be extruded along the entire length of said unwiped portion of the upper margin between said boundary and said desired location into said corner; and means for thereafter [moveing] *moving* the nozzle inwardly of said corner and for raising the nozzle upwardly of the insole.

2. The mechanism of claim 1 further comprising: a plate mounted for movement in forward-rearward directions; a block mounted to the plate for movement therewith; a first spindle mounted to the block for swinging movement with respect to the block about a prone axis that is transverse to said forward-rearward directions; a first yieldable drive means connected to and interposed between the first spindle and the block for effecting said downward force and said raising of the nozzle; a second spindle mounted to said first spindle for swinging movement about a heightwise extending axis; a nozzle holder, to which said nozzle is mounted, mounted to said second spindle for swinging movement therewith; and a second yieldable drive means connected to said nozzle holder for effecting said yieldable outward force and said inward movement of the nozzle.

3. The mechanism of claim 2 further comprising: a cement applying mechanism mounted to said plate; and passage means in said block, said spindles and said nozzle holder providing communication between the cement applying mechanism and the nozzle.

4. The mechanism of claim 1 further comprising: means for initially retaining the nozzle in an initial location that is rearward of the location wherein the means for applying the yieldably downward and outward forces to the nozzle are effected; an actuating member connected to the nozzle for forward movement therewith; a stop member located forwardly of the actuating member when the nozzle is in said initial location; means mounting the stop member for movement between a first position wherein it is in registry with the actuating member and a second position wherein it is out of registry with the actuating member; a motor connected to the nozzle for effecting said forward movement of the nozzle; means for initially retaining the stop member in said first position; means for causing the motor to move the nozzle forwardly until the actuating member engages the stop member; and means responsive to the engagement of the actuating member with the stop member to first effect a yieldable downward force to the nozzle [, then] *and* effect said yieldable outward force to the nozzle, and then effect a movement of the stop member to said second position whereby said motor may again move the nozzle forwardly.

5. The mechanism of claim 4 further comprising: means for adjusting the forward-rearward location of said stop member to thereby adjust the location wherein the yieldable downward and outward forces to the nozzle are effected.

6. The mechanism of claim 2 further comprising: means for initially retaining the plate in an initial location wherein the nozzle is rearward of the location wherein said first and second drive means are caused to apply said yieldable downward and outward forces to the nozzle; an actuating member connected to the plate for forward movement therewith; a stop member located forwardly of the actuating member when the plate is in said initial location; means mounting the stop member for movement between a first position wherein it is in registry with the actuating member and a second position wherein it is out of registry with the actuating member; a motor connected to the plate for effecting said forward movement of the plate and the nozzle; means for initially retaining the stop member in said first position; means for causing the motor to move the plate and the nozzle forwardly until the actuating member engages the stop member; and means responsive to the engagement of the actuating member with the stop member to first cause said first yieldable drive means to effect said downward force to the nozzle [then] *and* cause said second yieldable drive means to effect said yieldable outward force to the nozzle, and then effect movement of the stop member to said second position whereby said motor may again move the plate and the nozzle forwardly.

7. The mechanism of claim 6 further comprising: means for adjusting the forward-rearward position of said stop member to thereby adjust the location wherein said first and second yieldable drive means respectively effect said yieldable downward and outward forces to the nozzle.

8. The mechanism of claim 1 further comprising: control means operative concomitantly with the arrival of the nozzle at said boundary to cause said rearward movement of the nozzle and to cause said extrusion of cement through the nozzle.

9. The mechanism of claim 8 wherein said control means comprises: an actuating member connected to the nozzle for forward movement therewith; a stop means located forwardly of the actuating member when the nozzle is in said location wherein the yieldable downward and outward forces to the nozzles are effected and in registry with the actuating member; and means responsive to the intersection of the actuating member with the stop means to cause said rearward movement of the nozzle and to cause said extrusion of cement through the nozzle.

10. The mechanism of claim 9 further comprising: means for adjusting the forward-rearward location of the stop means.

11. The mechanism of claim 2 further comprising: control means operative concomitantly with the arrival of the nozzle at said boundary to cause said rearward movement of the nozzle and to cause said extrusion of cement through the nozzle, said control means comprising: an actuating member connected to the plate for forward movement therewith; a stop means located forwardly of the actuating member and in registry with the actuating member when the plate is in the location wherein said first and second drive means respectively effect said yieldable downward and outward forces to the nozzle; and means responsive to the engagement of the actuating member with the stop means to cause said rearward movement of the nozzle and to cause said extrusion of cement through the nozzle.

12. The mechanism of claim 11 further comprising: means for adjusting the forward-rearward location of the stop means.

13. The mechanism of claim 1 further comprising: control means operative concomitantly with the arrival of the nozzle at said desired location to terminate the extrusion of cement through the nozzle and effect said inward movement and rise of the nozzle.

14. The mechanism of claim 13 wherein said control means comprises: a cam connected to the nozzle for rearward movement therewith; a stop member and an actuating member located rearwardly of the cam when the nozzle is commencing its rearward movement in registry with the cam, the engagement of the cam with the stop member terminating the rearward movement of the nozzle with the nozzle at said desired location; and means responsive to the intersection of the cam with the actuating member to effect said termination of the cement extrusion and said inward movement and rise of the nozzle.

15. The mechanism of claim 14 further comprising: means for adjusting the forward-rearward location of the stop member and the actuating member.

16. The mechanism of claim 14 wherein the cam is connected to the nozzle for forward as well as rearward movement therewith and further comprising: means for initially locating the nozzle in an initial location wherein the cam is rearward of the stop member and the actuating member; means mounting the stop member and the actuating member for movement between a first position wherein they are out of registry with the cam and a second position wherein they are in registry with the cam; means for initially retaining the stop member and the actuating member in said first position; means, operative when the nozzle and the cam have moved forwardly to a position wherein the cam is forward of the stop member and the actuating member, for moving the stop member and the actuating member to their second position; and means, responsive to said intersection of the cam with the actuating member, for moving the stop member and the actuating member to said first position whereby the nozzle may be moved to said initial location.

17. The mechanism of claim 2 further comprising control means operative concomitantly with the arrival of the nozzle at said desired location to terminate the extrusion of cement through the nozzle and effect said inward movement and rise of the nozzle, said control means comprising: a cam connected to the plate for rearward movement therewith; a stop member and an actuating member located rearwardly of the cam when the nozzle is commencing its rearward movement in registry with the cam, the engagement of the cam with the stop member terminating the rearward movement of the plate with the nozzle at said desired location; and means responsive to the intersection of the cam with the actuating member to terminate said extrusion of cement through the nozzle and to cause said first and second yieldable drive means to effect said raising and inward movement of the nozzle.

18. The mechanism of claim 17 further comprising: means for adjusting the forward-rearward location of the stop member and the actuating member.

19. The mechanism of claim 17 wherein the cam is connected to the plate for forward as well as rearward movement therewith and further comprising: means for initially locating the plate in an initial location wherein the cam is rearward of the stop member and the actuating member; means mounting the stop member and the actuating member for movement between a first position wherein they are out of registry with the cam and a second position wherein they are in registry with the cam; means for initially retaining the stop member and the actuating member in said first position; means, operative when the plate and the cam have moved forwardly to a position wherein the cam is forward of the stop member and the actuating member, for moving the stop member and the actuating member to said second position; and means, responsive to said intersection of the cam with the actuating member, for moving the stop member and the actuating member to said first position whereby the plate may be moved to said initial location.

20. For use with a shoe assembly that includes a last having an insole located on its bottom and an upper mounted thereon, at least one end portion of the margin of the upper having been wiped against the insole and unwiped portions of the upper margin extending rearwardly of said wiped end portion and extending upwardly of the corresponding portion of the insole periphery; a method of applying cement into the corner between at least a first unwiped portion of the upper margin and the corresponding portion of the insole periphery comprising: supporting the shoe assembly bottom-up; applying a yieldable downward force to a nozzle *and a yieldable outward force to the nozzle such as* to cause the nozzle to bear against the insole *in said corner* rearwardly of *the boundary between* said wiped end portion and *said first unwiped portion;* [spacedly from said unwiped portion of the upper margin and said corresponding portion of the insole periphery; thereafter applying a yieldable force to the nozzle, while the downward force is maintained, to cause the nozzle to move into said corner rearwardly of the boundary between said wiped and unwiped portions;] thereafter moving the nozzle forwardly, while said downward and outward forces are maintained, until the nozzle arrives at said boundary; thereafter moving the nozzle rearwardly, while said downward and outward forces are maintained, and concomitantly extruding cement through the nozzle until the nozzle arrives at a desired location along said unwiped portion of the upper margin, to thereby cause the cement to be extruded along the entire length of said *first* unwiped portion of the upper margin between said boundary and said desired location into said corner; and thereafter moving the nozzle inwardly of said corner and raising the nozzle upwardly of the insole.

21. A cement applying mechanism comprising: support means for supporting bottom-up a shoe assembly that includes a last having an insole located on its bottom and an upper mounted thereon, at least one end portion of the margin of the upper having been wiped against the insole and unwiped portions of the upper margin extending rearwardly of said wiped end portion on the opposite sides of the shoe assembly and extending upwardly of the corresponding portions of the insole periphery; a pair of nozzles, located above the shoe assembly, mounted for unitary forward-rearward movement; means mounting the nozzles for heightwise movement; means mounting the nozzles for inward-outward movement; compensating means mounting the nozzles for relative forward-rearward movement with respect to each other; a motor connected to the nozzles for effecting their unitary forward-rearward movement; and cement extruding means effective to extrude cement through the nozzles during their unitary rearward movement; whereby the nozzles may be lowered against the insole and caused by said motor to be moved forwardly in unison up to the boundaries between said wiped portion and said unwiped portions while the nozzles are located in the corners between said unwiped portions of the upper margin and the corresponding portions of the insole periphery and the nozzles may thereafter be caused to move rearwardly by said motor while they are located in said corners until the nozzles arrive at desired locations along said corners while cement is extruded through the nozzles into said corners; and whereby said compensating means may enable the nozzles to move lengthwise relative to each other when the nozzles arrive at said boundaries.

22. The mechanism of claim 21 further comprising: a plate mounted for movement in forward-rearward directions; means connecting said motor to said plate; a transversely extending block connected to said plate for forward-rearward movement in unison therewith by pivot means mounting the block to the plate for swinging movement about a heightwise axis that is located intermediate the transverse ends of the block; and means mounting the nozzles to the block, on opposite sides of said axis, for heightwise movement and for inward-outward movement with respect to the block; said pivot means forming said compensating means.

23. The mechanism of claim 22 further comprising: stabilizing means effective to lock said block against movement about said axis prior to the lowering of the nozzles against the insole.

24. The mechanism of claim 23 wherein said stabilizing means comprises: a pair of rods mounted to said plate for movement in paths that are in intersecting relationship with said block on opposite sides of said axis; means for retaining said rods in engagement with said block; and means for moving the rods in said paths out of engagement with said block.

25. A cement applying mechanism comprising: support means for supporting bottom-up a shoe assembly that includes a last having an insole located on its bottom and an upper mounted thereon, the end portions of the margin of the upper having been wiped against the insole and the side portions of the upper margin, between said wiped end portions, being unwiped and backed up by back-up means located outwardly of said side portions and bearing against said side portions so as to cause said side portions of the upper margin to extend upwardly of the corresponding side portions of the insole periphery; a plate mounted for movement in forward-rearward directions; a motor connected to the plate for effecting movement of the plate in said directions; a transversely extending block onnected to said plate for forward-rearward movement ı unison therewith by pivot means mounting the block ɔ the plate for swinging movement about a heightwise xtending block axis that is located intermediate the transerse ends of the block; first spindles mounted to the lock on opposite sides of said block axis for swinging novement with respect to the block about a prone axis hat is transverse to said forward-rearward directions; secınd spindles mounted to said first spindles for swinging novement about heightwise extending axes; a nozzle ıolder mounted to each of said second spindles for swingng movement therewith; a nozzle mounted to each of said ıozzle holders; first yieldable drive means connected to ınd interposed between the first spindles and the block for ffecting heightwise movement of the nozzles; second ieldable drive means connected to the nozzle holders for ffecting inward-outward movement o fthe nozzles; stabiizing means actuable to lock said block against movement ıbout said block axis; cement extruding means actuable o extrude cement through said nozzles; means for iniially retaining the nozzles in upper and inner positions; neans for initially retaining the stabilizing means in acuated condition; means for initially retaining the cement xtruding means in unactuated condition; means for causng the first yieldable drive means to apply yieldable downvard forces to the nozzles *and means for causing the econd yieldable drive means to apply yieldable outward orces to the nozzles such as* to cause the nozzles to [bear ıgainst the insole between said wiped end portions and spacedly from said side portions of the upper margin and he insole of the periphery; means for thereafter causing he second yieldable drive means to apply yieldable outvard forces, while the downward forces are maintained, o cause the nozzles to] move into the corners between said upper margin side portions and the corresponding side portions of the insole periphery intermediate the boundaries between said unwiped side portions of the upper margin and said wiped end portions of the upper margin; means for deactuating said stabilizing means while *said* downward and outward forces are maintained; means for thereafter causing the motor to move the plate, together with the nozzles, forwardly, while said downward and outward forces are maintained, until the nozzles arrive at first boundaries between said side portions of the upper margin and a first of said wiped end portions of the upper margin, said pivot means permitting relative forward-rearward movement of the nozzles at said first boundaries; means for thereafter causing the [motors] *motor* to move the plate, together with the nozzles, rearwardly, while said downward and outward forces are maintained, and for concomitantly actuating the cement extruding means to extrude cement through the nozzles, until the nozzles arrive at second boundaries between said side portions of the upper margin and the second of said wiped end portions of the upper margin to thereby cause the cement to be extruded along the entire lengths of said side portions of the upper margin into the corners between said side portions of the upper margin and the corresponding portions of the insole periphery, said pivot means permitting relative forward-rearward movement of the nozzles at *said* second boundaries; means for thereafter causing the second yieldable drive means to move the nozzles inwardly of the corner and for causing the first yieldable drive means to raise the nozzles upwardly of the insole; and means, effective when the nozzles are in inward and raised positions, for reactuating the stabilizing means.

26. The mechanism of claim 25 wherein said stabilizing means comprises: a pair of rods mounted to said plate for movement in paths that are in intersecting relationship with said block on opposite sides of said block axis; and further comprising: means for moving the rods in said paths into and out of engagement with said block, the engagement of the rods with the block placing the stabilizing means in actuated condition.

References Cited

The following references, cited by the Examiner, are of record in the patented file of this patent or the original patent.

UNITED STATES PATENTS

| | | | |
|---|---|---|---|
| 2,972,670 | 2/1961 | Dorosz et al. | 118—410 |
| 3,035,287 | 5/1962 | Vlcek et al. | 12—12.4 |
| 3,251,081 | 5/1966 | Springer | 12—142 R |
| 3,675,260 | 7/1972 | Kamborian et al. | 12—12 |

PATRICK D. LAWSON, Primary Examiner

U.S. Cl. X.R.

12—12; 118—256